US 6,542,565 B2

(12) United States Patent
Ruddy et al.

(10) Patent No.: US 6,542,565 B2
(45) Date of Patent: Apr. 1, 2003

(54) SEMICONDUCTOR RADIATION SOURCE POWER MONITOR

(75) Inventors: Francis H. Ruddy, Monroeville, PA (US); Abdoul Raheem Dulloo, Pittsburgh, PA (US); John G. Seidel, Ingomar, PA (US); Frederick W. Hantz, Latrobe, PA (US); Louis R. Grobmyer, North Huntingdon, PA (US)

(73) Assignee: Westinghouse Electric Co., LLC, Pittsburgh, PA (US)

( * ) Notice: Subject to any disclaimer, the term of this patent is extended or adjusted under 35 U.S.C. 154(b) by 0 days.

(21) Appl. No.: 09/981,834

(22) Filed: Oct. 17, 2001

(65) Prior Publication Data

US 2003/0026374 A1 Feb. 6, 2003

Related U.S. Application Data

(60) Provisional application No. 60/241,340, filed on Oct. 18, 2000.

(51) Int. Cl.$^7$ .............................. G01T 1/00; G01T 3/00; G21C 17/00
(52) U.S. Cl. .................... 376/153; 376/254; 250/390.01
(58) Field of Search ................................. 376/153, 254; 250/390.01

(56) References Cited

U.S. PATENT DOCUMENTS

| 3,129,329 | A | * | 4/1964 | Love et al. ............ 250/370.04 |
| 3,227,876 | A | | 1/1966 | Ross |
| 3,869,608 | A | * | 3/1975 | Scherbatskoy ............... 250/262 |
| 5,083,028 | A | * | 1/1992 | Decossas et al. ........ 250/370.05 |
| 5,225,149 | A | * | 7/1993 | Banada ........................ 376/254 |
| 5,680,423 | A | * | 10/1997 | Perkins et al. .......... 250/390.11 |
| 5,726,453 | A | | 3/1998 | Lott et al. |
| 5,940,460 | A | | 8/1999 | Seidel et al. |
| 6,362,485 | B1 | * | 3/2002 | Joyce et al. ............ 250/370.05 |
| 6,369,381 | B1 | * | 4/2002 | Troxler et al. ............ 250/252.1 |
| 6,388,260 | B1 | * | 5/2002 | Doty et al. ............. 250/370.04 |

* cited by examiner

Primary Examiner—Michael J. Carone
Assistant Examiner—R Palabrica

(57) ABSTRACT

A solid state semiconductor neutron detector that automatically varies its sensitivity to provide a pulsed output over the entire range of operation of a nuclear reactor. The sensitivity is varied by changing the thickness or makeup of a converter layer that emits charged particles to the active region of the semiconductor surface.

30 Claims, 2 Drawing Sheets

SEMICONDUCTOR RADIATION SOURCE POWER MONITOR

CROSS-REFERENCE TO RELATED APPLICATIONS

This application claims priority under 35 U.S.C. §119(e) to provisional application Serial No. 60/241,340, filed Oct. 18, 2000

FIELD OF THE INVENTION

The present invention relates to neutron detectors, and more particularly relates to an array of solid state neutron sensors capable of measuring a wide range of neutron fluxes generated by nuclear power reactors and the like.

BACKGROUND OF THE INVENTION

Neutron detection is conventionally accomplished by using a detector of ionizing radiation and employing a conversion nuclear reaction whereby the neutron produces a charge particle product. The first neutron detectors were gas proportional counters which detected ionization produced by the highly charged fission fragments produced in neutron induced fission of $^{235}$U.

In pressurized water reactors, three types of gas proportional counters are typically used to provide coverage over the full range of neutron fluxes that are normally experienced during reactor operation. For the low neutron fluxes at reactor startup, a $BF_3$ proportional counter is used to record pulses from the $^{10}B(n,\alpha)$ reaction. This detector is operated in the pulse-counting mode until the neutron flux reaches the $10^4$ to $10^5$ $cm^{-2}$-$seconds^{-1}$ range, corresponding to $10^5$ to $10^6$ counts per second in the detector. At these count rates, linearity in count rate as a function of neutron flux begins to deteriorate due to the pulse pile-up, and at about $10^6$ counts per second, individual pulses cannot be distinguished. The neutron flux range from startup to about $10^4 cm^{-2}$-$second^{-1}$ is referred to as the Source Range. A second type of detector, a boron-lined ionization chamber, is used to monitor neutron flux above $10^3 cm^{-1}$-$second^{-1}$. Because of the inherently large count rate, this counter is operated in the current mode, i.e., individual pulses are summed to form a current which is monitored. However, although the current generated by neutron counts is proportional to neutron flux and to reactor power, current is also generated by gamma ray interactions with the detector. Therefore, gamma compensation must be used, because gamma ray intensity is not proportional to reactor power in the low power range. A second detector, without a boron liner, which was used in the first detector to generate neutron-induced particles for counting, is used to determine current generated by gammas only and this current is subtracted from the observed current for the boron-lined first detector. This pair of ionization chambers is referred to as a compensated ion chamber (CIC). CICs are used to monitor reactor power from neutron fluxes of about $10^3 cm^{-2}$-$second^{-1}$ to above $10^{10} cm^{-2}$-$second^{-1}$, which is close to full reactor power. This range of neutron fluxes is referred to as the Intermediate Range, and the $BF_3$ and CIC power monitors are referred to as the Source Range and Intermediate Range detectors, respectively. For neutron fluxes higher than about $10^7 cm^{-2}$-$second^{-1}$, gamma ray intensity becomes proportional to power, and gamma compensation is no longer necessary. Boron-lined ion chambers, without gamma compensation, are used from $10^7 cm^{-2}$-$second^{-1}$ to $2.5 \times 10^{10} cm^{-2}$-$second^-$, the range of neutron fluxes referred to as the Power Range. The Source, Intermediate and Power Ranges are indicated in FIG. 1, which shows the thermal neutron flux in $neutrons/cm^2/second$ at the detector location over the Source Range 10, Intermediate Range 12 and Power Range 14. The Source Range is shown in counts per second and the Intermediate and Power Ranges are shown in amperes.

In order to monitor power from startup to full power, data from all three types of detectors are needed. During the transition from the high end of the Source Range into the lower end of the Intermediate Range, the responses from the Source Range and Intermediate Range detectors must be matched. This matching can be particularly difficult because two inherently different types of detectors are being used. A pulse mode Source Range detector must be matched to a current mode, gamma compensated Intermediate Range detector. Difficulties in matching these responses when changing power can result in operating delays and, in extreme cases, in reactor trips. To further complicate the matter, due to the extreme sensitivity of the Source Range detector, to avoid early failure, the Source Range is turned off during Power Range operation. It has not been uncommon for the Source Range detector to fail when an attempt is made to reactivate the detector upon power down of the reactor.

An alternative to using a gas-filled detector is to use a semiconductor or solid state detector. Conventional semiconductor neutron detectors consist of a silicon surface barrier detector with a layer of boron, lithium or fissionable material adjacent to the active volume of the detector. One such solid state neutron detector using silicon semiconductor is disclosed in U.S. Pat. No. 3,227,876.

A problem with prior art neutron detectors is sensitivity of the detector to non-neutronic components of the radiation field, particularly gamma ray sensitivity. Gas-filled detectors are favored in nuclear reactor applications because low density gases are inherently inefficient detectors for gamma rays which deposit their energy over large volumes. Solid state detectors, on the other hand, are more sensitive to gamma rays because of their higher electron density.

Solid state semiconductor detectors are candidates for replacement of conventional gas filled detectors, but they have not found widespread use in the nuclear industry because of problems associated with background signal and deterioration of detector performance during operation in intense, hostile radiation environments.

U.S. Pat. No. 5,726,453, issued Mar. 10, 1998 and U.S. Pat. No. 5,940,460, issued Aug. 17, 1999, describe a radiation resistant solid state neutron detector that can discriminate between neutron and gamma responses on the basis of pulse height. Based on these two properties displayed by, but not necessarily limited to, silicon carbide (SiC) neutron detectors, an improved solid state neutron detector is desired that can operate over the wide range of reactor operation. Furthermore, it is an objective of this invention to provide such a detector that can operate over the entire range of operation of a reactor in the pulse mode. Additionally, it is an object of this invention to provide a detector that can function over the entire range of operation of the nuclear reactor employing a single type of electronics train to process the detector output.

SUMMARY OF THE INVENTION

These and other objects are achieved by employing a detector having at least one array of sensors, each sensor having a semiconductor active region for generating an electronic output signal in response to charged particles emitted from a converter layer in response to the neutron emissions from a neutron source such as a reactor core. The electronic output is processed by a single electronics train for each detector for processing the electronics output signals of each of the arrays of sensors associated with that detector to provide an output indicative of the power of the source. Means are also provided for changing the sensitivity to neutron emissions of the detector when the electronic output pulse count exceeds or drops below pre-selected rates, e.g., the count rate exceeds the rate the electronics train can discriminate counts from or the count rate is too slow to provide meaningful information.

In one embodiment, the detector includes at least two arrays of sensors with each array having a different sensitivity. The electronics train then switches between arrays when the pre-selected rates of count are detected.

In another preferred embodiment, the means for changing the sensitivity of the detectors changes the converter layer composition either by changing the depth or makeup of the converter material.

An additional feature of the invention is that during full power operation, it alters the converter material associated with sensors whose outputs are not being monitored so the corresponding semiconductor active region is not bombarded with charged particles. Additionally, the detector of this invention can be employed to provide a more accurate display of the axial power distribution of a reactor core than current ex-core detectors.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
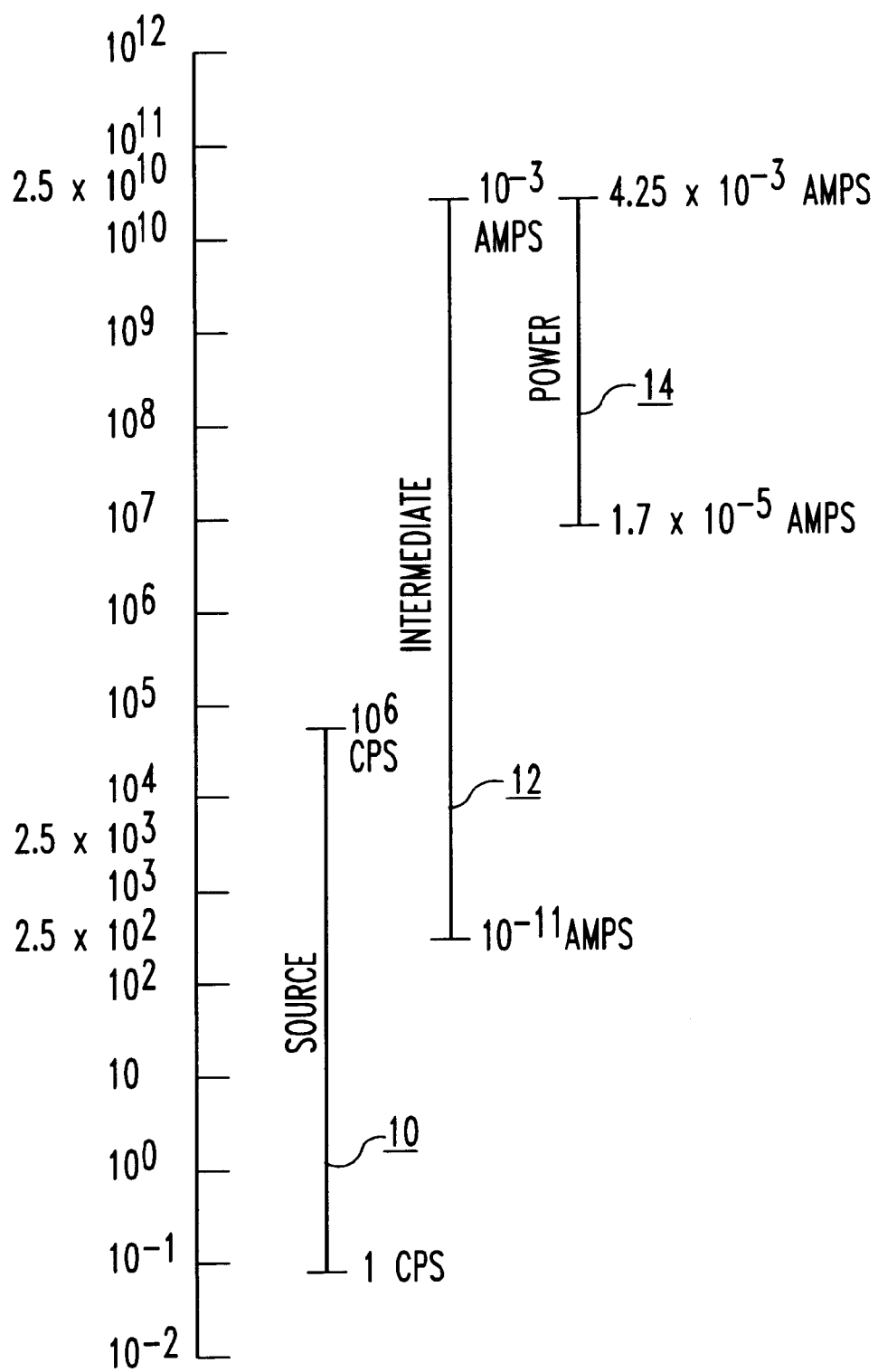
FIG. 1 is a graphical illustration of the prior art Source, Intermediate and Power Ranges of reactor operations.

Recently, semiconductor neutron detectors, and particularly silicon carbide (SiC) neutron detectors in embodiments described in U.S. Pat. Nos. 5,726,453 and 5,940,460, have been shown to be reliable devices for monitoring neutron flux over a wide range of fluxes. Furthermore, the gamma ray and neutron responses of these detectors have been shown to be separable on the basis of pulse height. Based on these two properties displayed, but not necessarily limited to, SiC neutron detectors, this invention provides a wide range neutron detector that will overcome many of the reactor power monitoring difficulties noted previously. This is accomplished by providing a solid state semiconductor power monitor that is designed to cover the entire power range from startup to full power in the pulse mode of operation without any gamma compensation.

A typical SiC neutron detector consists of a SiC diode, either a Schottky diode or P–N junction, or an array of diodes juxtaposed with a layer of $^6$LiF or other neutron-sensitive material which will interact with neutrons to produce charged particles which will produce electronic pulses when they pass through the SiC diodes. In this case, the $^6$Li $(n,\alpha)^3$H reaction is used. Both the alpha particle and the triton ($^3$H) can interact with the active volume of an adjacent diode to produce an electrical pulse. Three factors can be used to adjust the sensitivity of a SiC neutron detector, the area of the SiC diode, the number of diodes and the thickness of the $^6$LiF layer. In accordance with this invention, a single detector is constructed that contains combinations of diodes and converter layers that permit it to operate in the Source, Intermediate and Power Ranges.

A single SiC semiconductor reactor power monitor detector is designed in accordance with this invention to have multiple sensitivities. For example, a set of ten 6-mm diameter SiC diodes at each of twelve axial locations juxtaposed with 24.2$\mu$m $^6$LiF layers would have a sensitivity, S-1, equal to 0.614 cps/nv (where nv refers to neutron flux in units of cm$^2$-second$^{-1}$). A second array of sets of ten 500 $\mu$m diameter diodes at each of twelve axial locations and juxtaposed with a 24.2 $\mu$m $^6$LiF layer would have a sensitivity, S-2, equal to 4.264$\times$10$^{-3}$ cps/nv. A third array of sets of ten 500 $\mu$m diameter diodes at each of twelve axial locations and juxtaposed with 0.05 $\mu$m $^6$LiF layers would have the sensitivity, S-3, equal to 1.319$\times$10$^{-5}$ cps/nv. The count rates for each of these diode arrays as a function of thermal neutron flux are shown below in Table 1.

TABLE 1

Detector count rates as a function of thermal neutron flux

| Neutron Flux (nv) | S-1 (cps) | S-2 (cps) | S-3 (cps) |
|---|---|---|---|
| 0.1 | 0.0614 | 0.0004264 | |
| 1 | 0.614 | 0.004264 | |
| 10 | 6.14 | 0.04264 | |
| 100 | 61.4 | 0.4264 | |
| 1000 | 614 | 4.264 | |
| 10000 | 6140 | 42.64 | 0.1319 |
| 100000 | 61400 | 426.4 | 1.319 |
| 1000000 | 614000 | 4264 | 13.19 |
| 10000000 | 6140000 | 42640 | 131.9 |
| 100000000 | 61400000 | 426400 | 1319 |
| 1000000000 | 614000000 | 4264000 | 13190 |
| 10000000000 | 6140000000 | 42640000 | 131900 |
| 50000000000 | 30700000000 | 213200000 | 659500 |

It can be seen from the data of Table 1 that useable count rates are obtained in the sensitivity S-1 range from startup to about 10$^5$ nv, at which point very fast electronics would be required to measure count rates above 6$\times$10$^4$ cps. However, the diode arrays corresponding to sensitivity S-2 range have a count rate of approximately 400 cps at this point and could be used to record data with the same pulse processing electronics used for the first range, up to a neutron flux of approximately 10$^7$ nv. At that flux level, the diodes from array 3 have a count rate of greater than 100 cps and can record data with the same electronics as used for the other two sensitivity ranges, at neutron fluxes up to full power, which is approximately 2.5$\times$10$^{10}$ nv. The sensitivity of diode array 3 can be further reduced by selecting counts from one diode rather than ten at each axial location, resulting in a count rate of 3.30$\times$10$^4$ cps at full reactor power. This count rate is well within the pulse processing capabilities of typical electronic systems. The term "diode" comprises the active region of the semiconductor and is used interchangeably with the term "sensor".

The detector of this invention, with multiple built in sensitivity ranges, can be connected to a single electronic pulse-processing train. Transitions between ranges can be accomplished automatically based on detector count rate. A computer can be used to control the detector internal sensitivity changes and to correct the output data to the proper sensitivity to allow the reactor power level to be inferred.

The above combination of internal sensitivities is provided as an example. The sensitivity ranges chosen will depend upon the speed of the electronics components that are employed and will result from an optimization of the detector response characteristics to the nuclear plant measurement environment in which it is deployed. If faster electronics become available, a wider dynamic range of output count rates can be used, and internal sensitivities can be adjusted accordingly. While three ranges of sensitivities are used in this example, it should be appreciated that as few as two or as many as four or more may be used as well.

In order to provide longer service lifetimes, the detector arrays with higher sensitivities can be protected when not in use from bombardment by charged particles produced in the neutron-converter layer. This can be accomplished by either removing the $^6$LiF layer from the vicinity of the SiC diodes or by inserting a shutter between the $^6$LiF foil and the active region of the diodes to absorb the charged particles. An example of several materials which can be used for such a shutter are stainless steel, aluminum, zirconium, zircalloy or other material of at least 50 micrometers thickness that is capable of withstanding the nuclear environment.

The response of SiC neutron detectors reflects a much more localized neutron fluence rate than that measured by the much larger gas filled ex-core detectors. Therefore, detectors must be deployed at sufficient locations to give an accurate representation of the axial power profile. Whereas the integral count rate over all of the axial locations can be used to provide a measure of total core power, the individual count rates can be used to evaluate axial power profiles. Additionally, the multisensor detector arrays positioned at twelve axial locations can provide data at each of those locations independently to enable the plant operator to use the data to evaluate core flux tilt and axial offset.

The detector of this invention can also replace the functions of the so called wide range fission chamber used in boiling water reactors and some pressurized water reactors. The detector of this invention has been shown to have a more linear response to reactor power than a fission chamber at close to full power. Furthermore, the detector of this invention contains no uranium or other materials that will result in radioactivation and exposures of plant personnel to high levels of radiation during detector repair or replacement. Furthermore, radioactive waste disposal costs are much less than for conventional detectors.

Figure 2:
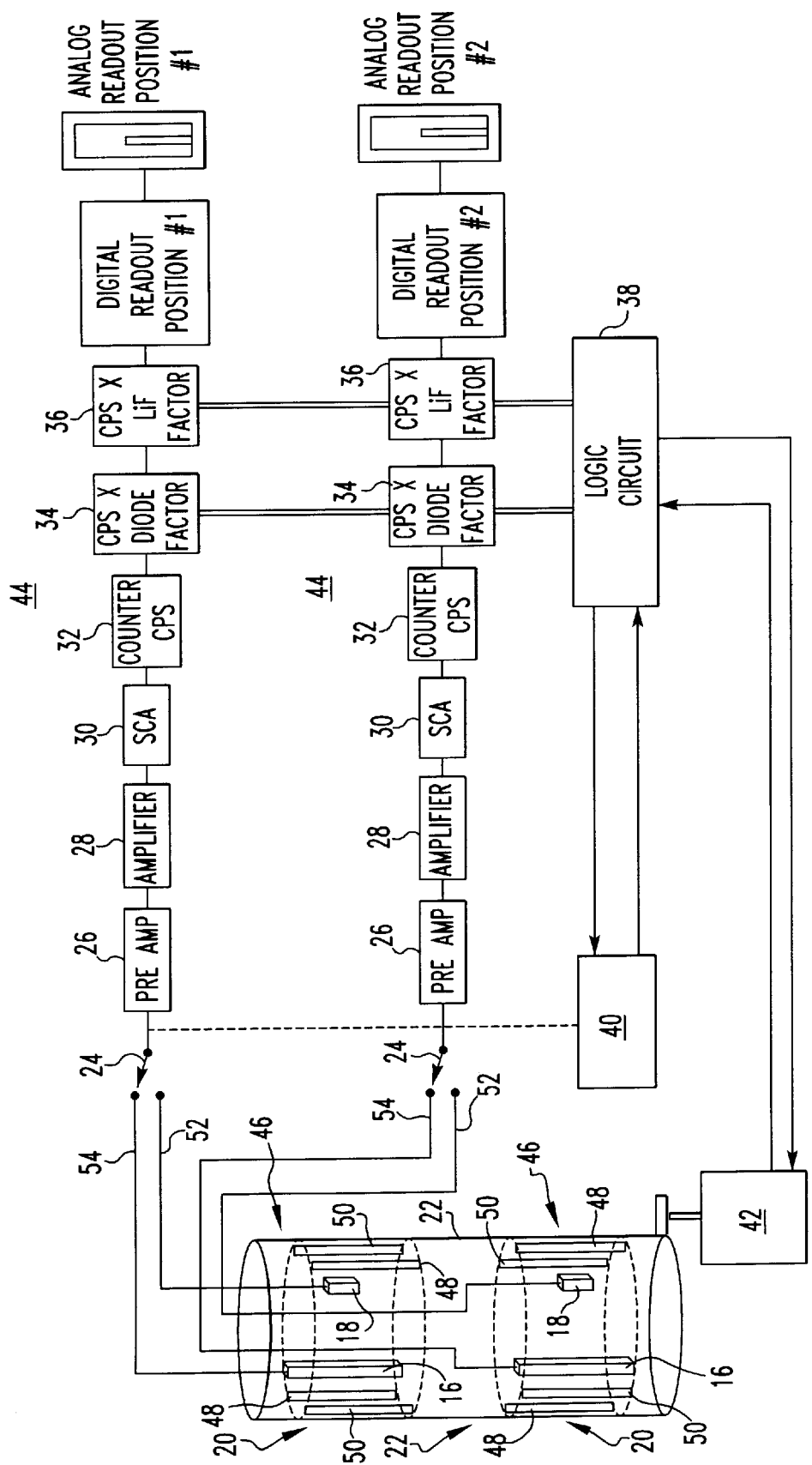
FIG. 2 is a schematic of the detector and electronic signal processing train of this invention.

FIG. 2 illustrates two alternative embodiments for carrying out the principles of this invention. Arrays of SiC sensors 46 are positioned along the length of the detector system. The arrays 46 are more fully described in U.S. Pat. No. 5,940,460, issued to the assignee of this invention. These groupings 46 can be used to monitor the axial profile of the reactor core when positioned between the reactor vessel and the biological shield. While only two groupings are shown for illustrative purposes, it should be appreciated that as many as twelve or more groupings may be used for a more precise profile. The two groupings 46 each include a more sensitive sensor array 16 and a less sensitive sensor array 18. The sensitivity of the array is established by the number of individual diodes that are connected in parallel. The more diodes connected in parallel, the more sensitive the sensor. The counting circuits 44 can be switched between the sensor arrays 16 and 18 having different active areas. Separate electronic trains for each detector array 46 can allow simultaneous data acquisitions for each detector, higher total throughput, and reduced noise due to a lower input capacitance. The detector array output cables 52 and 54 for the arrays 18 and 16 are routed to a switch 24, which can alternately connect the cables 54 and 52 to the electronics train 44 The output signals are routed through a preamplifier 26 and for conditioning the signal to an amplifier 28. Then the amplified signal is sent to a single channel analyzer 30 that discriminates between the lower amplitude pulses, representative of the gamma response, from the higher amplitude pulses indicative of the neutron response. The counts representative of the neutron response are then sent to a counter, which provides an output in counts per second. This output is then modified by a diode factor 34, which compensates for the sensitivity of the sensor employed. The signal is then further modified by a converter layer factor 36 to account for the sensitivity of the converter layer. The counts per second are monitored by the logic circuit 38. If the counts per second are above or below pre-selected values, then the logic circuit signals the switch drive 40 to switch the sensitivity of the detector by, for example, transferring switch 24 from output 54 to output 52. The pre-selected values are chosen so that if the counts per second are so high that the electronics cannot distinguish between pulses, the logic circuit directs the switch drive 40 to transfer the switch 24 from the higher sensitive array 16 to the lower sensitive array 18 by transferring connections from the output cable 54 to the output cable 52. Conversely, if the electronics train 44 is connected to the output cable 54 and logic train detects that the counts per second are so low that meaningful information is not being transferred, then the logic circuit directs the switch drive 40 to transfer the connection from the output cable 52 to the more sensitive detector output 54. A return signal is sent by the switch drive 40 to the logic circuit to verify the position of the switch 24. A shutter system (not shown in FIG. 2) can be built into each array whereby a material such as stainless steel, aluminum, zirconium, zircalloy, or other material of at least 50 μm thickness that is capable of withstanding the nuclear environment can be interposed between the converter and semiconductor active region, e.g., by a solenoid, to absorb the charged particles and preserve the semiconductor active region when it is not in use. Two groupings of converter foils are illustrated in FIG. 2 represented by the rotating drum 22, converter foils 48 and 50 and drum drive 42. In this embodiment, spaced converter foils 48 and 50 are supported on the surface of the drum 22 in the vicinity of the detector arrays 16 and 18, preferably coextensive with and spaced from the active area of the semiconductor region. Two such foils are shown, 48 and 50, for each such array 16 and 18. Each group of converter foils, 48 and 50, corresponds to a converter layer of different thickness to provide a different sensitivity. Converter foils 48 provide high sensitivity whereas converter foils 50 provide low sensitivity. The logic circuit activates the drum drive 42 to rotate the drum to have the appropriate foil placed in front of the active region of the semiconductor array 16 or 18. The converter foil can also be rotated away from the sensor arrays to locations that do not emit charged particles in response to incident neutrons and function similar to the shutter shade previously described. Instead of employing a separate foil, the shutter material can be the drum surface with the drum drive 42 programmed to position the drum to a fourth position outside the sensor arrays view of the converter foils.

Alternatively, the array outputs for each detector grouping 46 can be processed through the same electronics train by multiplexing the outputs. That would further reduce the cost of the system, but result in a loss of redundancy.

Another alternative for varying the sensitivity of the detectors is to multiplex the sensor outputs. The electronics train would then select which and how many sensors within an array it monitored based upon the rate of pulses received.

Thus, the detector system of this invention covers the neutron flux range of operation of a nuclear reactor from startup to full power without any requirement for gamma ray compensation. A single electronic pulse processing train can be used to acquire data from the detector at all reactor power levels. The sensitivity of the detector can be adjusted automatically to optimize the signal output and transitions between ranges can be accomplished smoothly and rapidly. More accurate axial profile information can be obtained than is currently available from ex-core detectors. It is anticipated that this solid state design will be more reliable and have a longer service lifetime than either boron gas-filled or fission chamber neutron detectors. Additionally, the detector requires no materials that undergo radioactivation, thereby reducing occupational radiation exposures and radioactive waste disposal costs.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any all equivalents thereof.

What is claimed is:

1. A system for measuring neutron emissions from a source comprising:
    at least one detector positioned to receive the neutron emissions from the source, the at least one detector comprising at least one array of sensors, each sensor having a semiconductor active region for generating an electronic output signal in response to charged particles emitted from a converter layer, positioned between the source and the semiconductor active region, in response to the neutron emissions from the source;
    a single electronics train for each detector for processing the electronics output signals of each of said arrays to provide an electronics output pulse count rate indicative of the neutron emissions of the source; and
    means for automatically changing a sensitivity to the neutron emissions of at least one of the detectors by changing a physical characteristic of the converter layer between the source and the semiconductor active region when the electronics output pulse count rate exceeds or drops below pre-selected rates.

2. The system of claim 1 wherein the electronic output is a pulsed signal and the electronic output from each sensor within each array is added to the electronic output of another of said sensors in that array.

3. The system of claim 1 wherein the means for changing the physical characteristics of the converter layer changes the converter layer composition.

4. The system of claim 1 wherein the means for changing the converter layer composition changes the material makeup of the converter layer.

5. The system of claim 1 wherein the means for changing the converter layer composition changes a depth of the converter layer.

6. The system of claim 1 wherein the means for changing the composition of the converter layer comprises a cylinder that is rotatably supported, the cylinder having at least two converter layers spaced around its circumference at substantially the same axial elevation, with at least one of the detectors inside the cylinder, at substantially the same axial elevation, with a semiconductor active region of a corresponding sensor positioned opposite and spaced from one of the at least two converter layers on the circumference of the cylinder with each of the at least two converter layers having a different sensitivity to the neutron emissions, and wherein the active semiconductor region is aligned with one or the other of the at least two converter layers and the sensitivity of the sensor is changed by a means for rotating the cylinder so the semiconductor active region of the sensor lines up with the other of the at least two converter layers.

7. The system of claim 6 wherein means for rotating the cylinder automatically switches from at least one of the two converter layers to the other of the at least two converter layers when the electronics output pulse count rate exceeds or drops below the pre-selected rates.

8. The system of claim 7 wherein the means for rotating the cylinder automatically switched from one of the at least two converter layers that is more sensitive to neutron emissions to the other of the at least two converter layers that is less sensitive to neutron emissions when the electronics output pulse rate exceeds a first pre-selected value and from the less sensitive converter layer to the more sensitive converter layer when the electronics output pulse rate drops below a second pre-selected value.

9. The system of claim 8 wherein the first pre-selected value for the count rate is below the saturation value of the electronics train at which the electronics train can no longer reliably count and process the output pulses.

10. The system of claim 6 including a shutter layer circumferentially spaced from the at least two converter layers at approximately the same axial elevation, that when interposed between the source and the active semiconductor region the shutter layer substantially inhibits charged particles from impinging on the active semiconductor region.

11. The system of claim 1 wherein the single electronics train for each detector selectively processes the electronics output signals of each of said arrays and the at least one detector includes a shutter mechanism and means for activating the shutter mechanism that when activated inhibits charged particles from impinging on substantially all of the active semiconductor region of the sensors of the detector whose output signals are not being processed by the electronics train while the electronics train is processing the output signals of other sensors of the detector system.

12. The system of claim 11 wherein the at least one of the detectors that includes the shutter mechanism includes at least two arrays of sensors with each array of sensors having a different sensitivity to the neutron emissions, wherein the electronics train includes means for processing the electronic output of one of the at least two sensor arrays and not the other while the electronic output of the one of the at least two sensor arrays is being processed and the means for activating the shutter mechanism activates the shutter mechanism associated with the array whose electronic output signal is not being processed by the electronics train when the electronics train is processing the electronics output from the other of the at least two sensor arrays.

13. An ex-core detector system for measuring a power along an axial length of a core of a nuclear reactor from outside of a reactor pressure vessel comprising:
    a plurality of detectors respectively positioned at successive axial locations along the core, exterior of the pressure vessel, to receive neutron emissions from within the core, each of said plurality of detectors comprising at least one array of sensors, each sensor having a semiconductor active region for generating an electronic, pulsed, output signal in response to charged particles emitted from a converter layer positioned between the reactor pressure vessel and the semiconductor active region, in response to the neutron emissions from the core;

a single electronics train for each detector for processing the electronics signal of said array to provide an electronics output pulse count rate indicative of the power of the core; and means for automatically changing a sensitivity to the neutron emissions, of at least one of the detectors by changing a physical characteristic of the converter layer between the reactor pressure vessel and the semiconductor active region, when the electronics output pulse count rate exceeds or drops below pre-selected rates.

14. The ex-core detector system of claim 13 wherein each detector primarily measures the power in the core at a radial plane at the axial location of the detector.

15. The ex-core detector system of claim 13 wherein the detectors provide a linear response to power changes over a full normal power operating range of the reactor.

16. The ex-core detector system of claim 13 wherein at least one of the detectors comprises at least three arrays of sensors.

17. The ex-core detector system of claim 13 wherein the detectors are positioned at spaced axial locations.

18. The ex-core detector system of claim 13 wherein the means for changing the physical characteristics of the converter layer changes the converter layer composition.

19. The ex-core detector system of claim 18 wherein the means for changing the converter layer composition changes the material makeup of the converter layer.

20. The ex-core detector system of claim 13 wherein the means for changing the physical characteristics of the converter layer changes the depth of the converter layer.

21. The ex-core detector system of claim 13 wherein the means for changing the physical characteristics of the converter layer comprises a cylinder that is rotateably supported, the cylinder having at least two converter layers spaced around its circumference at substantially a same axial elevation, with at least one of the detectors inside the cylinder, at substantially the same axial elevation, with the semiconductor active region of a corresponding sensor positioned opposite and spaced from one of the at least two converter layers on the circumference of the cylinder with each of the at least two converter layers having a different sensitivity to the neutron emissions, and wherein the active semiconductor region is aligned with one or the other of the at least two converter layers and the sensitivity of the sensor is changed by a means for rotating the cylinder so the semiconductor active region of the sensor lines up with the other of the at least two converter layers.

22. The ex-core detector system of claim 21 wherein the means for rotating the cylinder automatically switches from one of the at least two converter layers to the other of the at least two converter layers when the electronics output pulse count rate exceeds or drops below the pre-selected rates.

23. The ex-core detector system of claim 22 wherein the means for rotating the cylinder automatically switched from one of the at least two converter layers that is more sensitive to neutron emissions to the other of the at least two converter layers that is less sensitive to neutron emissions when the electronics output pulse rate exceeds a first pre-selected value and from the less sensitive converter layer to the more sensitive converter when the electronics output pulse rate drops below a second pre-selected value.

24. The ex-core detector system of claim 23 wherein the first pre-selected value for the count rate is below a saturation value of the electronics train at which the electronics train can no longer reliably count and process the output pulses.

25. The ex-core detector system of claim 21 wherein the at least two converter layers are of different thickness.

26. The ex-core detector system of claim 21 wherein the at least two converter layers are made up of different materials that have different sensitivities to the neutron emissions.

27. The ex-core detector system of claim 21 wherein there are at least three converter layers spaced around the circumference of the cylinder.

28. The ex-core detector system of claim 21 including a shutter layer circumferentially spaced from the at least two converter layers at approximately the same axial elevation, that when interposed between the reactor core and the active semiconductor region the shutter layer substantially inhibits charged particles from impinging on the active semiconductor region.

29. The ex-core detector system of claim 13 wherein the single electronics train for each detector selectively processes the electronics output signals of each of said arrays and at least one of the detectors includes a shutter mechanism and means for activating the shutter mechanism that when activated inhibits charged particles from impinging on substantially all of the active semiconductor region of the sensors of the detector whose output signals are not being processed by the electronics train when the electronics train is processing the electronics output signals of other sensors of the detector system.

30. The ex-core detector system of claim 29 wherein the at least one of the detectors that includes the shutter mechanism includes at least two arrays of sensors with each array of sensors having a different sensitivity to the neutron emissions, wherein the electronics train includes means for processing the electronic output of one of the at least two sensor arrays and not the other while the electronic output of the one of the at least two sensor arrays is being processed and the means for activating the shutter mechanism activates the shutter mechanism associated with the array whose electronic output signal is not being processed by the electronics train when the electronics train is processing the electronics output from the other of the at least two sensor arrays.

* * * * *